United States Patent
Irie

[11] 3,838,905
[45] Oct. 1, 1974

[54] LIGHT-CONDUCTING STRUCTURES AND PRODUCTION THEREOF

[76] Inventor: Masanori Irie, 17, 3-chome, Mukonso, Amagasaki, Japan

[22] Filed: Feb. 22, 1972

[21] Appl. No.: 228,402

Related U.S. Application Data

[63] Continuation of Ser. No. 858,866, Sept. 17, 1969, abandoned.

[30] Foreign Application Priority Data

Sept. 19, 1968 Japan.................................. 43-68103

[52] U.S. Cl. ........................ 350/96 R, 350/175 GN
[51] Int. Cl. ............................................ G02b 5/14
[58] Field of Search .................... 350/96 R, 175 GN

[56] References Cited
UNITED STATES PATENTS

| | | | |
|---|---|---|---|
| 3,212,401 | 10/1965 | Navias..................... | 350/175 GN X |
| 3,320,114 | 5/1967 | Schulz......................... | 350/96 R X |
| 3,434,774 | 3/1969 | Miller.......................... | 350/96 WG |
| 3,485,556 | 12/1969 | Naujokas ................. | 350/175 GN X |
| 3,495,511 | 2/1970 | Javorik..................... | 350/175 GN X |
| 3,516,239 | 6/1970 | Fukuda et al. ................ | 350/96 B X |
| 3,614,197 | 10/1971 | Nishizawa et al. ........... | 350/96 WG |
| 3,658,407 | 4/1972 | Kitano et al...................... | 350/96 B |

OTHER PUBLICATIONS

Miller, Article in Bell System Technical Journal Vol. 44, No. 9, Nov. 1965, pgs. 2,017–2,030.
Kawakami et al., Article in Proceedings of the IEEE Dec. 1965, pgs. 2,148 & 2,149.

*Primary Examiner*—David H. Rubin
*Attorney, Agent, or Firm*—Robert E. Burns; Emmanuel J. Lobato; Bruce L. Adams

[57] ABSTRACT

Light-conducting structures each having a gradual refractive index gradient in a direction transverse to the direction in which light is to advance in the structure, which structure is made of a transparent mixture of at least two synthetic polymers having different refractive indexes, the proportions of the polymers in the mixture being such that they vary progressively in a direction transverse to the direction in which light is to advance thereby to create the refractive index gradient. This variation in the mixture of at least two polymers is produced by selective extraction of the mixture by a solvent in which one polymer in the mixture is soluble but the other polymer is less soluble.

7 Claims, No Drawings

LIGHT-CONDUCTING STRUCTURES AND PRODUCTION THEREOF

This is a continuation of my copending U.S. application Ser. No. 858,866 filed Sept. 17, 1969 and now abandoned.

BACKGROUND OF THE INVENTION

The present invention relates generally to light-conducting structures and more particularly to new light-conducting structures each made of synthetic resin having a refractive index gradient in a direction transverse to the direction in which light is to advance in the structure, and to the production thereof.

The conventional light-conducting structure made of synthetic resin consists of a core for light conduction having higher refractive index and a coating thereover having lower refractive index. In such a light-conducting structure, an incident light beam entering thereinto from one end thereof advances therein with repetition of total reflection thereby to cause lagging or aberration in the phase velocity and the loss of light due to the reflection.

In order to overcome these drawbacks, a light-conducting glass structure has been proposed in which the refractive index is reduced gradually toward the surface from the center axis, as set forth in copending U.S. Pat. application Ser. No. 806,368.

SUMMARY OF THE INVENTION

An object of the present invention is to provide novel light-conducting structures made of synthetic resin without entailing drawbacks as described above.

Another object of the invention is to provide light-conducting structures having such advantages as lower manufacturing cost, lighter weight as well as higher flexibility, as compared with the glass structure of the above-mentioned prior application.

Still another object of the invention is to provide a process and modifications thereof to produce the light-conducting structures.

Other objects of the invention will presently become apparent from the following description.

The foregoing objects have been achieved by the invention, in one aspect of which there is provided a light-conducting structure made of synthetic resin having a refractive index such that in a given cross section transverse to the direction in which light is to advance in the structure, the index varies progressively and steadily with increasing distance away from the center point or center line of the section, which resin comprises a transparent mixture of at least two synthetic polymers having different refractive indexes, the proportion of polymers in the mixture varying progressively with said increasing distance in said cross section thereby to create said variation of the refractive index.

In another aspect of the invention, there is provided a process for producing a light-conducting structure made of synthetic resin which comprises preparing a mixture comprising, in a predetermined proportions at least two transparent synthetic polymers having different refractive indexes and having different solubilities into a specific solvent, forming the mixture into a shaped body, and treating the body with the solvent thereby to extract out of the surface of the body a part of the polymers in a proportion different from said original proportion.

DETAILED DESCRIPTION

The light-conducting structure embodying the present invention is of a shaped body preferably in the form of bar-like shape such as a bar or a fiber. The refractive index in a given cross section perpendicular to the center axis of the body such as a bar or fiber varies gradually from the central port of the cross section to the periphery thereof. It is preferable that the variation or distribution of the refractive index in the cross section be approximately representable by the following equation.

$$N = N_o (1 - ar^2),  \quad (1)$$

wherein:
$r$ is the distance in a radial direction from the center in the cross section,
$N_o$ is the refractive index of the mixture at the central part of the structure,
$N$ is the refractive index at a point at distance $r$ in the cross section, and
$a$ is a constant.

In the case where $a$ is positive, a light-conducting structure which is a particularly important embodiment of the present invention is provided. Incident light beam entering from one end of such a body is conducted therethrough to the opposite end with repetition of vibration around the center axis, the periodic length of the vibration being $2\pi/\sqrt{2a}$, without substantial lagging in the phase velocity and loss of light due to the reflection. The light-conducting structure is equivalent in nature to a convex lens or a system of a plurality of convex lenses, and is capable of image transmission.

In another embodiment of the invention in which the constant $a$ is negative, it is equivalent in nature to a concave lens when the length of the axial direction thereof is relatively short, and can be utilized as a concave lens of small diameter and as a means for correcting chromatic aberration of the light-conducting structure in which the constant $a$ is positive.

The light-conducting glass structure stated above in which the refractive index in a given cross section varies progressively with increasing distance away from the center point in the cross section is one embodiment of the present invention. The invention also includes as another embodiment thereof such structure being disclosed and claimed in copending and commonly assigned U.S. application Ser. No. 806,368, now abandoned in favor of continuation application Ser. No. 147,256, filed May 26, 1971. as a structure having such a refractive index distribution in a cross section perpendicular to a center plane thereof as to satisfy substantially the equation $N = N_o(1 - ar^2)$, wherein $N_o$ represents the refractive index at the center line which is the line of intersection of the center plane and the plane of the cross section, $N$ represents the refractive index at a normal point at a distance $r$ from said center line, and $a$ is a constant, whereby light introduced into one end face transverse to said center plane is conducted therethrough to be directed out of other end face opposite said one end face. Such a non-cylindrical or non-concentric structure is equivalent in function to an usual cylindrical lens or a combination of the cylindrical lenses.

The process for producing the light-conducting structure of the present invention will now be described.

The polymers to be used in admixture must be transparent although they are not necessarily colorless, have different refractive indexes, show different solubilities in a specific solvent, and be mixable into an optical homogeneity.

Any combination of polymers may be utilized as long as the above requirements are satisfied. A combination of a homopolymer of monomer X and a copolymer of monomer X plus a small amount of monomer Y, a combination of a copolymer A of monomers X and Y in a certain proportion and a copolymer A' of monomers X and Y in a proportion different from that in the copolymer A, or a combination of homo- or copolymers different only in the degree of polymerization is preferable. Examples of the polymers are homo- or copolymers of styrene, nuclear and/or side chain-substituted styrenes, particularly lower alkyl substituted styrenes such as $\alpha$-methyl styrene and vinyl toluenes, lower alkyl methacrylates, vinyl chloride and vinyl esters. Every polymer has its inherent refractive index. Stabilizers, plasticizers, lubricants, and/or fillers are added to the polymers if desired.

Preparation of the polymer mixture can be carried out by any convenient procedure. The procedure, in general, depends on the type of the polymers used. Mixing or kneading of heat-plasticized polymers by means of rolls or a kneader, dry-blending of polymer powders, and mixing of polymers in a solution followed by evaporation of the solvent used are typical examples of the procedure. Little or no chemical coupling between the polymers will occur.

The mixture of polymers and optional additives is then molded into a shaped body such as, for example, a bar or a fiber of diameter of 0.05 mm to 50 mm. In the case where the polymers used is thermoplastic, extrusion and injection moldings are typical, the former being preferable for the production of a rod. In the case where the polymers are thermosetting, compression and transfer moldings are typical. In order to produce a fiber, any of conventional spinning procedures can be employed. The shaped body thus produced is optically homogeneous and has a certain refractive index.

The shaped body can be in any structural form such as a plate, a film, a ribbon, a tube, as well as a rod or bar, and a fiber.

The shaped body is then treated with a solvent and thereby caused to undergo the selective extraction. The solvent is of course a "selective solvent" in which one polymer in the polymer mixture of the shaped body is soluble while the other polymer (or polymers) in the mixture is (are) less soluble. Any liquid solvent inclusive of liquefied gases and inclusive of mixtures thereof may be used as long as it is selective. The selectivity of the solvent for a given combination of polymers can easily be ascertained by consultation of certain chemical dictionaries or by a single experiment.

The treatment is preferably carried out by immersing the shaped body into a bath containing the solvent for a certain time.

In order to obtain a light-conducting structure in which the constant $a$ in Equation (1) is positive, it is necessary to select a solvent by which the polymer having a higher refractive index is preferentially extracted.

In order to obtain a light-conducting structure in which $a$ is negative, on the other hand, it is necessary to select a solvent by which the polymer having a lower refractive index is preferentially extracted. The extraction can be carried out at room temperature, but a higher temperature may be used thereby to shorten the time required. The higher temperature is below the heat deformation temperature of the shaped body.

The extent of the selective extraction is reduced gradually from the surface toward the center of the shaped body. After the selective extraction reaches the central part of the body, the body is withdrawn from the bath, and any solvent on or within the body is evaporated off.

The shaped body after having undergone such an extraction treatment is in some cases finely porous at the surface thereof. In such cases, the body may be drawn in the plastic state into a fiber if the polymers used are thermoplastic.

The resulting synthetic resin body for light conduction is provided with the refractive index distribution which nearly satisfies Equation (1) and is capable of conducting the light beam as described above. The refractive index distribution of the body may be regulated by the type of the polymers, polymerization degrees, and mixing ratio of the polymers used, type of the solvent, temperature and time of the impregnation process used, and the diameter of the rod or the fibrous body.

Examples of the present invention are given below. They are not intended to limit the scope of the invention.

Example 1.

70 parts of methyl methacrylate monomer and 30 parts of styrene monomer was suspended in 200 parts of water, and 0.3 part of benzoyl peroxide was used as a catalyst. These materials were caused to react for approximately 12 hours at approximately 90° C to obtain a copolymer (polymer A) whose refractive index was 1.518. The refractive index of a copolymer (polymer B) which was obtained by copolymerizing 50 parts of methyl methacrylate monomer and 50 parts of styrene monomer under the same condition was 1.541.

Equal quantities of the polymer A and polymer B were mixed, and the resulting mixture was heated at a temperature ranging from 170° to 190° C for plasticization, and thereafter it was kneaded by means of rolls until it became optically homogeneous and molded into a rod having a diameter of 5 mm by means of an extruding machine. Next, this rod was immersed in amyl acetate bath at room temperature for 24 hours. More of the polymer B was extracted from the surface of the rod than the polymer A in the amyl acetate bath. The amyl acetate adhering to or contained in the resulting rod was evaporated. One end of the rod was electrically heated at approximately 165° C, and the portion thus heated was drawn to obtain a fibrous body whose diameter was about 0.1 mm.

The refractive index of the center axis portion of the fibrous body (the value of $N_o$ in the foregoing Equation (1)) was 1.530 and the refractive index on the surface portion was 1.520. The refractive index distribution $N$ in each cross section satisfied approximately the foregoing Equation (1). Accordingly, this fibrous body could be used for light conduction, and an incident light beam entering from one end thereof was transmitted to the other end without causing aberration of phase velocity and loss due to reflection.

Example 2.

100 parts of vinyl chloride monomer and 0.2 part of polyvinyl alcohol were added to 200 parts of water, and the mixture was subjected to polymerization with a catalyst of lauroyl peroxide (0.2 part) for approximately 24 hours at approximately 60° C. A suitable quantity of sodium bicarbonate to maintain the pH value of the polymerization at 6 – 8 was added during the polymerization to obtain poly vinyl chloride (polymer A). The refractive index of the resulting polymer A was 1.542. 7. parts of vinyl chloride monomer and 3. parts of vinyl acetate monomer were copolymerized by the same process to obtain a copolymer (polymer B) whose refractive index was 1.515. A mixture of the polymer A (70 parts) and polymer B (30 parts) was heated at temperatures ranging from 160° to 180° C for plasticization, thereafter kneaded by means of rolls to obtain optical homogeneity, and formed into a rod having a diameter of 5 mm by means of an extruding machine. This rod was immersed in a 1,2-dichloroethane bath for 10 hours at room temperature. The polymer A was preferentially extracted in the 1,2-dichloroethane bath. After 1,2-dichloroethane adhering to or existing in the resulting rod had been evaporated, a part of the rod was electrically heated at approximately 150° C, and the part thus heated was drawn to obtain a fiber approximately 0.05 mm in diameter. The refractive index (the value of $N_o$ in the foregoing Equation (1)) of the center axis portion of the fibrous body was 1.540, and the refractive index on the surface portion was 1.534, the refractive distribution in each cross section N approximately satisfied Equation (1). This fibrous body could be used for light conduction, and had an effect similar to that of the fibrous body in Example 1.

I claim:

1. A light-conducting device comprising a cylindrical organic resin body having a center axis and having a gradient in refractive index which decreases progressively and steadily in each cross section perpendicular to said center axis in the radial direction from said axis toward the periphery of said body substantially in accordance with the equation:

$$N = N_o (1 - ar^2),$$

wherein:
 r is the distance in a radial direction from said axis
 $N_o$ is the refractive index of the mixture at said axis N is the refractive index at a point at radial distance r, in said cross section and
 a is a constant, said resin body comprising a transparent solid mixture of at least two polymers which are mixable into optical homogeneity, the first of said polymers having a higher refractive index and a different solubility in a solvent than that of the second of said polymers, each of said polymers being present at the axis of said body in a predetermined proportion to provide a predetermined index of refraction, the proportion of said first polymer present in said mixture decreasing and the proportion of said second polymer present in said mixture increasing progressively and steadily from said predetermined proportion in the radial direction from the axis of said body toward the periphery thereof, the thus varying proportions of said polymers providing said gradient in refractive index.

2. A light-conducting device as claimed in claim 1 in which said cylindrical body has a maximum dimension in said cross section of from 0.05 to 50 mm.

3. A light-conducting device according to claim 1 in which said polymers are each copolymers and each of said copolymers contain units of a common monomer.

4. A light-conducting device according to claim 3 in which said body is composed of a mixture of two methyl methacrylate/styrene copolymers wherein the first copolymer has a larger molar ratio of methyl methacrylate/styrene and a larger refractive index than the second copolymer, and the proportion of said first copolymer in each cross section perpendicular to the axis of said body progressively decreases from the axis toward the periphery of said body thereby providing said gradient in refractive index.

5. A light-conducting device according to claim 1 in which said body is composed of a mixture of homopolymer and a copolymer wherein said copolymer contains units of the monomer present in said homopolymer.

6. A light-conducting device according to claim 5 in which said first polymer is poly(vinyl chloride) and said second polymer is a vinyl chloride/vinyl acetate copolymer.

7. A light-conducting device comprising an organic resin body having a longitudinal axis and a gradient in refractive index which decreases progressively and steadily in each cross section perpendicular to said axis in the radial direction from the axis to the periphery of said body substantially in accordance with the equation:

$$N = N_o (1 - ar^2),$$

wherein:
 r is the distance in a radial direction from said axis
 $N_o$ is the refractive index of the mixture at said axis N is the refractive index at a point at radial distance r, in said cross section and
 a is a constant, said resin body consisting essentially of a transparent solid mixture of two components, a first component which is a synthetic organic polymer having a predetermined refractive index and a second component which is a synthetic organic polymer having a refractive index lower from that of said first component, said first and second components being mixable into optical homogeniety, the proportion of said first component in said mixture decreasing progressively with an increase in the radial distance from said axis toward the periphery of said body and the proportion of said second component in said mixture increasing progressively from said axis toward the periphery of said body and the varying proportions of said components thereby providing said gradient in the refractive index of said body.

* * * * *

UNITED STATES PATENT OFFICE
CERTIFICATE OF CORRECTION

PATENT NO. : 3,838,905
DATED : October 1, 1974
INVENTOR(S) : Masanori IRIE

It is certified that error appears in the above-identified patent and that said Letters Patent are hereby corrected as shown below:

On the title page in column 1, after the Inventor is listed and before Filed, please insert:

Assignee: NIPPON SELFOC KABUSHIKI KAISHA, Tokyo, Japan

Signed and sealed this 20th day of May 1975.

(SEAL)
Attest:

RUTH C. MASON
Attesting Officer

C. MARSHALL DANN
Commissioner of Patents
and Trademarks